United States Patent [19]

Grishko et al.

[11] Patent Number: 5,031,521
[45] Date of Patent: Jul. 16, 1991

[54] ELECTROPLASMOLYZER FOR PROCESSING PLANT RAW MATERIAL

[76] Inventors: Alexei A. Grishko, ulitsa Karmanova, I2, kv.3I.; Vladimir M. Kozin, Ulitsa Dimo, 7/3, kv.I22.; Vasily G. Chebanu, bulvar Sovetskoi Armii, I6, kv.I6., all of Kishinev, U.S.S.R.

[21] Appl. No.: 613,632

[22] PCT Filed: Mar. 27, 1989

[86] PCT No.: PCT/SU89/00077
§ 371 Date: Nov. 27, 1990
§ 102(e) Date: Nov. 27, 1990

[87] PCT Pub. No.: WO90/11025
PCT Pub. Date: Oct. 4, 1990

[51] Int. Cl.$^5$ .............................................. A23L 3/00
[52] U.S. Cl. ........................................ 99/451; 99/483; 99/DIG. 14
[58] Field of Search ................. 99/358, 451, 483, 484, 99/646 R, DIG. 14; 219/1055 R; 426/238, 244; 335/209, 220

[56] References Cited

U.S. PATENT DOCUMENTS

| | | | |
|---|---|---|---|
| 337,334 | 3/1886 | Jones et al. | 99/451 |
| 1,162,213 | 11/1915 | Bloom | 99/451 |
| 4,457,221 | 7/1984 | Geren | 99/516 |
| 4,608,920 | 9/1986 | Scheglov et al. | 99/483 |
| 4,723,483 | 2/1988 | Papchenko et al. | 99/516 |
| 4,753,810 | 6/1988 | Scheglov et al. | 426/238 |
| 4,787,303 | 11/1988 | Papchenko et al. | 99/451 |

Primary Examiner—Timothy F. Simone
Attorney, Agent, or Firm—Fleit, Jacobson, Cohn, Price, Holman & Stern

[57] ABSTRACT

The electroplasmolyzer for processing plant raw material comprises a cylindrical casing (1) having inlet and outlet holes (2, 3) and electrodes (5) arranged uniformly along a generating line within the cylindrical casing (1). The electroplasmolyzer, according to the invention, also comprises T-shaped electromagnets (6) disposed uniformly on the outer surface along the generating line of the cylindrical casing (1). The number of the electromagnets (6) is a multiple of three. Each electromagnet (6) is arranged above an interelectrode space formed by adjacent electrodes (5) to which its coil (8) is connected. An axis (9) of a yoke (10) of each electromagnet (6) is parallel to a longitudinal axis (4) of the cylindrical casing (1).

1 Claim, 1 Drawing Sheet

ELECTROPLASMOLYZER FOR PROCESSING PLANT RAW MATERIAL

FIELD OF THE INVENTION

The present invention relates to food processing and, in particular, to an electroplasmolyzer for processing plant raw material.

PRIOR ART

There is known an electroplasmolyzer for processing plant raw material (cf., B.R.Lazarenko et al. "Electroplasmolyz ", 1977, Kishinev: Kartya moldovenyaske, pp. 48, 49), which comprises a cylindrical casing having inlet and outlet holes and circular electrodes disposed uniformly along a generating line within said cylindrical casing. The electrodes are connected to a power source. Plant raw material passed through the cylindrical casing is processed with electric current. A disadvantage of the foregoing electroplasmolyzer for processing plant raw material is that the current gradient is non uniformly distributed within the casing due to the utilization of circular electrodes and their installation along the generating line of the cylindrical casing. The current gradient is maximum in proximity to the inner surface of the cylindrical casing. It generally decreases towards the longitudinal axis of said cylindrical casing. Consequently, plant raw material is processed nonuniformly and juice yield therefrom is insufficient.

There is also known an electroplasmolyzer for processing plant raw material (cf., SU, A, 535.076), which comprises a cylindrical casing having inlet and outlet holes and three sector electrodes arranged uniformly along a generating line withon the cylindrical casing at an angle of 120° relative to one another. Crushed plant raw material is fed through the inlet hole to the cylindrical casing and fills its inner space.

Said crushed plant raw material moving within the casing of the electroplasmolyzer for processing plant raw material is processed with electric current supplied to the electrodes.

In the known electroplasmolyzer for processing plant raw material, the current gradient is distributed uniformly only in the interelectrode space formed by lateral surfaces of adjacent electrodes. Hence, nonuniform distribution of the current gradient occurs in the rest of the cylinder casing. As a result, the crushed plant raw mass is processed nonuniformly and juice yield therefrom is insufficient.

DISCLOSURE OF THE INVENTION

The object of the present invention is to create an electroplasmolyzer for processing plant raw material, in which the use of a magnetic field interacting with an electric field within a cylindrical casing would permit redistribution of the electric field therein and increase a current gradient in areas characterized by an insufficient degree of processing of plant raw material with electric current so as to obtain uniform processing of crushed plant raw mass and a greater juice yield therefrom.

This is solved by that an electroplasmolyzer for processing plant raw material, comprising a cylindrical casing having inlet and outlet holes and electrodes disposed uniformly along a generating lilne within the cylindrical casing, according to the invention, includes T-shaped electromagnets disposed uniformly on the outer surface along the generating line of the cylindrical casing, their number being a multiple of three each electromagnet being arranged above the interelectrode space formed by adjacent electrodes to which its coil is connected, while the yoke axis of each electromagnet is parallel to the longitudinal axis of the cylindrical casing.

The proposed electroplasmolyzer for processing plant raw material permits increasing juice yield from crushed plant raw mass by 1.5 to 2.5% in primary processing of apples into juice owing to the fact that the cytoplasm of plant raw material cells is disintegrated throughout the inner space of the cylindrical casing. The crushed plant raw mass is processed uniformly, a feature increasing operational stability and efficiency of equipment for processing plant raw material.

With a greater juice yield, apple pomace contains less moisture, which is generally a fuel-saving factor. Furthermore, the drying rate substantially increases. Juice yield increases by 0.5 to 0.75% in processing grape pomace. The juice contains all acids, vitamins and sugar of the basic material. It is particularly advantageous to process fox (Vitris labrusca) grape which, according to the known techniques, undergoes fermentation at the initial stage or is heat-treated for 12 to 48 hrs before juice is extracted. Advantages of the produced electroplasmolyzer are smaller consumption of ferments and a shorter heat-treatment period. The processing of beet cossettes in the electroplasmolyzer, according to the invention, improves quality of diffusion juice and saves thermal energy. Also, protein coagulation is improved when the proposed electroplasmolyzer is used in agricultural production for obtaining protein concentrate from plant raw material.

Moreover, the electroplasmolyzer forming the subject of the present invention does not need attemdance all the time and is reliable in operation. Owing to its small dimensions and weight, the proposed electroplasmolyzer may be shipped by any transport over long distances, a feature increasing the time of its seasonal use.

BRIEF DESCRIPTION OF THE DRAWINGS

The invention will now be described further with reference to a specific embodiment thereof, taken in conjunction with the accompanying drawings, wherein.

BEST MODE FOR CARRYING OUT THE INVENTION

Figure 1:
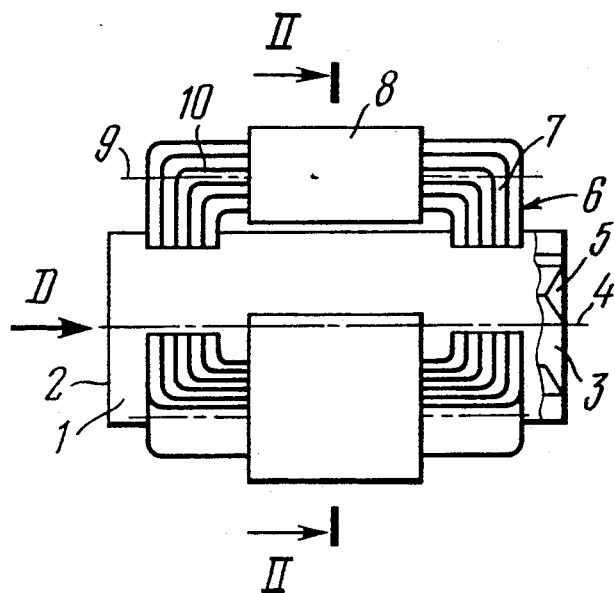
FIG. 1 is a general view of an electroplasmolyzer for processing plant raw material, according to the invention.

The electroplasmolyzer for processing plant raw material forming the subject of the present invention comprises a cylindrical casing 1 (FIG. 1) made of a suitable dielectric, for example, glass-fibre-base laminate, and having an inlet hole 2 and outlet hole 3. Three sector electrodes 5 are placed within the casing 1 in parallel with its longitudinal axis 4. The electrodes 5 are arranged uniformly along a generating line of the cylindrical casing 1 at an angle of 120° relative to one another. The electrodes 5 are fabricated from a suitable metal chemically inactive to food, for example, titanium. Arranged iniformly on the outer surface of the cylindrical casing 1 along its generating line are three T-shaped electromagnets 6 comprising a core 7 made of electrical-sheet steel and a coil 8. The electromagnets 6 are installed so that an axis 9 of a yoke 10 of the core 7 of each electromagnet 6 is parallel to the longitudinal axis 4 of the casing 1. The number of the electromagnets 6 is a multiple of three. The number of the electromagnets 6 is chosen to be a multiple of three to obtain an optimal effect of the magnetic field on redistribution of the current gradient within the casing 1 of the electroplasmolyzer, according to the invention. In the drawing, arrow D shows direction of movement of plant raw material.

Figure 2:
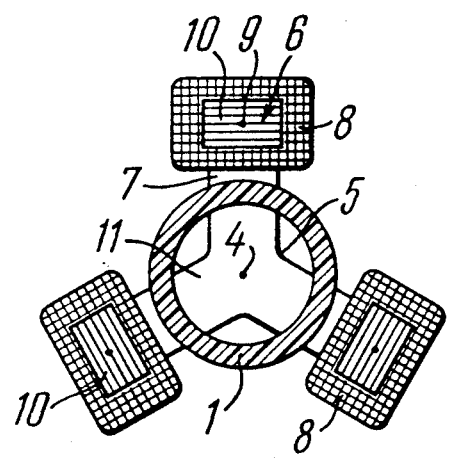
FIG. 2 is a cross-sectional view along line II—II of FIG. 1 depicting the electroplasmolyzer for processing plant raw material, according to the invention.

Each electromagnet 6 is arranged above an interelectrode space 11 (FIG. 2) formed by adjacent electrodes 5 to which the coil 8 of the electromagnet 6 is connected.

Installation of the T-shaped electromagnets 6 above the interelectrode space 11 and parallel arrangement of the axis 9 of the yoke 10 relative to the longitudinal axis 4 of the casing 1 make it possible to set up a magnetic field which equalizes the current gradient throughout the inner space of the casing 1, an advantage ensuring uniform processing of plant raw material and an additional juice yield and intensifying the electroplasmolyzing process.

Figure 3:
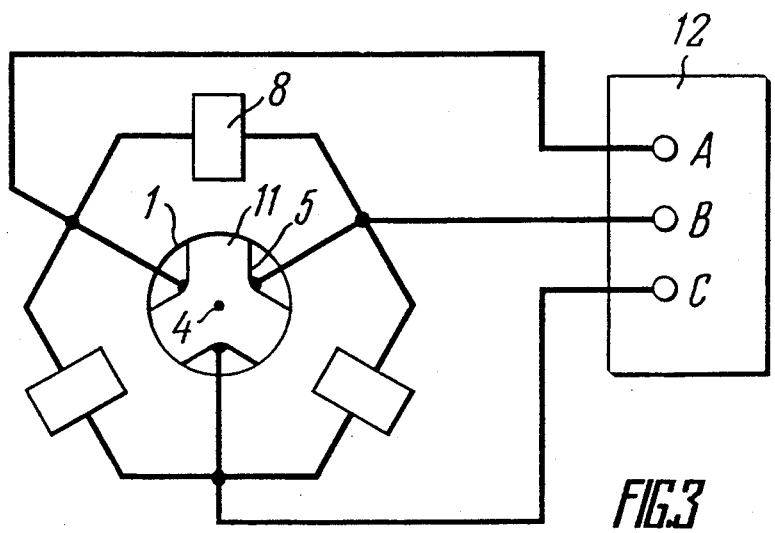
FIG. 3 is a circuit diagram illustrating connection of electrodes and coils of electromagnets to a three-phase power source, according to the invention.

The circuit diagram of FIG. 3 shows connection of the electrodes 5 and the coils 8 to phases A, B and C of a three-phase power source 12.

Each electrode 5 is connected to the corresponding phase A, B or C of the power source 12. For example, one electrode 5 is connected to the phase A, the other electrode 5 in a clockwise direction is connected to the phase B and the following electrode 5 is connected to the phase C. Each coil 8 arranged above the interelectrode space 11 formed by adjacent electrodes 5 is connected to said electrodes 5 so that the start of one coil 8 is connected to the finish of the contiguous coil 8. Connection of the coil 8 to adjacent electrodes 5 with the electromagnet 6 (FIG. 2) placed above the interelectrode space 11 makes it possible to automatically synchronize the effect of the magnetic flux with current flowing between said electrodes 5 (FIG. 3).

When the electrodes 5 are energized, the plant raw material passes current along all current paths, a magnetic field being set up around each path. Most of the current paths are found between the electrodes 5. The zone with a small current gradient is arranged in the centre around the longitudinal axis 4 (FIG. 1) of the casing 1. In said zone, plant raw material is processed incompletely. The T-shaped electromagnets 6 set up an external magnetic field whose direction is determined by the construction of the electromagnet 6 and its position on the casing 1 of the electroplasmolyzer. When the core 7 of the electromagnet 6 is parallel to the axis 4 of the casing 1, magnetic induction of the external magnetic field is perpendicular to the current paths.

As the external magnetic field interacts with the circular magnetic fields, the resultant magnetic field produces a force acting on the current paths and directed towards the longitudinal axis 4 of the casing 1. There occurs redistribution of the current paths within the casing 1 and overlapping of the zone wherein plant raw material is processed incompletely. Thus, the current gradient is equalized throughout the inner space of the casing 1 and crushed plant raw mass is processed uniformly.

The number of the electrodes 5 within the casing 1 of the electroplasmolyzer may be a multiple of the number of phases A, B and C of the power source 12. Each pair of adjacent electrodes 5 is connected to different phases (A, B and C). Hence, the phases A, B and C of the power source 12 are loaded uniformly. In the preferred embodiment of the invention installation of the electromagnets 6 above the interelectrode space 11 and connection of the leads of the coils 8 to adjacent electrodes 5 make it possible to equalize the current gradient throughout the inner space of the casing 1, an advantage ensuring uniform processing of plant raw material and increasing juice yield therefrom.

The electroplasmolyzer for processing plant raw material, according to the present invention, operates in the following manner.

After crushing, plant raw material is fed by means of a pump (not shown in the Drawing) to the cylindrical casing 1 (FIG. 11) through the inlet hole 2, thereby filling the inner space of the casing 1. Simultaneously the electrodes 5 and the coils 8 of the electromagnets 6 are supplied with voltage from the three-phase power source 12. Electric current passed through said plant raw material affects its cells causing separation of cytoplasm from husk. The formed channels let out cell juice, which increases cell permeability and juice yield from plant raw material in subsequent processing by means of a press or centrifuge (not shown in the Drawing). The current flowing through the coils 8 of the electromagnets 6 produces a magnetic flux in the core 7. Said magnetic flux sets up a magnetic field in the interelectrode space 11. The lines of force of the magnetic field cross the power lines of the electric field.

Installation of the electromagnets 6 and connection of the coils 8 should provide for crossing of the lines of force of the magnetic and electric fields at right angles. The electric field is redistributed in the casing 1 and the current gradient is equalized in the inner space of the casing 1. Stated differently, the current gradient increases in areas wherein said plant raw material is insufficiently processed with electric current. Consequently, the crushed plant raw mass is processed in a uniform manner and the juice yield therefrom increases. The processed portion of said plant raw material is discharged from the electroplasmolyzer through the outlet hole 3 in the casing 1 and fed to the press or centrifuge The pump will then feed another portion of said plant raw material and the electroplasmolyzing process will repeat. So, said process occurs continuously. Said plant raw material is processed in the closed casing 1 without access for oxygen, which prevents burning of said plant raw material on the electrodes 5 and the occurrence of the oxidizing process. The proposed electroplasmolyzer comprising the electromagnets 6 provides for uniform electrical processing of fruit, vegetables and roots and increases juice yield therefrom.

Moreover, the electroplasmolyzer forming the subject of the present invention is simple, compact and easy to manufacture. It is reliable and safe in operation and can be easily installed on production lines for processing plant raw material.

INDUSTRIAL APPLICABILITY

The invention may be used in primary processing of fruit, vegetables and roots and also in food, sugar and pharmaceutical industries and in fodder making.

We claim:

1. An electroplasmolyzer for processing plant raw material, comprising a cylindrical casing having inlet and outlet holes and electrodes arranged uniformly along a generating line within the cylindrical casing, characterized in that it includes T-shaped electromagnets (6) disposed uniformly on the outer surface along the generating line of the cylindrical casing (1), the number of the electromagnets (6) being a multiple of three, each electromagnet (6) being arranged above an interelectrode space (11) formed by adjacent electrodes (5) to which its coil (8) is connected, while an axis (9) of a yoke (10) of each electromagnet (6) is parallel to a longitudinal axis (4) of the cylindrical casing (1).

* * * * *